Patented Aug. 31, 1948

2,448,460

UNITED STATES PATENT OFFICE 2,448,460

PROCESS OF PRODUCING AN INORGANIC HYDROGEL

Jerry A. Pierce and Charles N. Kimberlin, Jr., Baton Rouge, La., assignors to Standard Oil Development Company, a corporation of Delaware No Drawing. Application March 7, 1944, Serial No. 525,438

7 Claims. (Cl. 252—317)

This invention relates to the art of producing adsorbent gels in spherical form and more particularly relates to the preparation of spheres having diameters of 1 mm. or less.

Inorganic gels are well known and have long been used for various purposes, for example for the adsorption of condensible vapors from gaseous carriers and for catalytic purposes either as the catalyst itself or as a component thereof or as a carrier. Simple gels may be used alone or after impregnation with catalytic materials or if desired plural gels such as silica-alumina gels may be used. The present invention deals with the preparation of such gels which can be used for any of the above mentioned purposes either as simple gels or as plural gels. The present method is capable of producing gel particles in uniform spherical shapes which have particularly desirable industrial uses and have many advantages over the irregularly shaped particles ordinarily produced by grinding larger gel aggregates.

The gels produced according to this invention have been found to be particularly useful as catalysts for carrying out reactions involving hydrocarbons and particularly in the so-called fluid catalyst process in which the catalyst is in powdered form and is aerated or fluidized by means of a gas so that it acquires the properties of a liquid such as fluid flow and hydrostatic pressure.

It has already been proposed to prepare adsorbent gels in spherical form by dispersing a suitable sol in a viscous medium such as oil. However, this method may be disadvantageous when handling sols which set within a few minutes after they have been prepared since it is not always convenient or possible to prepare the spheres from the sol immediately after the sol is formed. It is therefore an object of this invention to prepare a sol in such a manner that it sets directly to a spherical hydrogel without any intermediate step. It has now been found that sols may be prepared by mixing the separate sol-forming constituents in a non-completely water-miscible liquid under emulsifying conditons. The sol-forming constituents may be added as aqueous solutions to the non-completely water-miscible liquid and at least one of the constituents may be added as a solution in the non-completely water-miscible liquid, but it is necessary for one of the constituents to be insoluble in the liquid so as to insure emulsification. It is preferable that at least one of the constituents be pre-emulsified but it is possible for the emulsifier to be added directly to the non-completely water-miscible liquid. The constituents used in forming the sols under emulsifying conditions may be simple constituents which will form single sols or a plurality of constituents may be used to form plural sols. It is also possible to mix a plurality of pre-formed sols under the same conditions to form a plural sol. Thus sulfuric acid and sodium silicate may be separately emulsified in a non-completely water-miscible liquid and mixed to form a simple sol. On the other hand sodium silicate may be emulsified and added to an emulsion of aluminum chloride to form a plural silica-alumina sol, or preformed sols of silica and alumina may be mixed in a similar manner to form the plural sol.

The non-completely water-miscible liquids used may be completely water-immiscible or only partially water-miscible. Suitable water-immiscible liquids include hydrocarbons, such as naphtha, kerosene, mineral seal oil, lubricating oil, gas oil, benzene, etc. and other organic liquids such as ethylene dichloride, acetylene tetrabromide, etc. Suitable partially water-miscible liquids include normal butanol, secondary butanol, methyl ethyl ketone, diethyl ketone, mesityl oxide, butyl aldehyde, propio-nitrile, acrylonitrile, valeric acid, nitromethane, etc. Suitable emulsifiers include any surface active agent, such as the partial glycol esters, for example diglycol oleate, sulfonic acids, organic sulfates, and sufonates, naphthenic acids, lecithin, and the usual commercial emulsifiers.

The sols prepared according to the present invention set to hydrogel spheres having diameters less than 1 mm. The actual diameters of the spheres depend upon the degree of dispersion which is a function of the degree of agitation, the kind and amount of surface active agent, the viscosity of the non-completely water-miscible liquid and the ratio of sol to non-completely water-miscible liquid.

In order to obtain optimum product quality in the prepared gel, it is necessary to control within narrow limits the pH of the mixture obtained when the sol-forming ingredients are combined. However this restricts the range of composition of materials thus made, particularly when forming plural gels containing alumina, since a change in the alumina content generally results in a concomitant change in the pH. This difficulty, however, may be overcome by adding sufficient acid or base to the individual components prior to mixing so that the pH of the mixture remains constant. Thus if a plural alumina-silica gel of high silica content is desired, an acid may be added to the aluminum salt solution before it is emulsified. If a high alumina content is desired an alkali may be added to the silicate before it is emulsified.

The nature of the present products and the methods of manufacture are illustrated by the following examples.

*Example I*

A dilute water-in-oil type emulsion was prepared from 40° Bé' sodium silicate, benzene and diglycol oleate. A similar emulsion was prepared from a 30% solution of AlCl₃—6H₂O, benzene and diglycol oleate. The two were mixed with agitation. By the reaction of a particle of sodium silicate with one of AlCl₃, each finely divided by the emulsification, a minute globule of a silica-alumina compound was formed. After removal of the benzene and emulsifying material the collected particles were washed and dried. The finished material consists of minute, solid spheres which are transparent and hard.

*Example II*

A solution of 4 normal acetic acid in benzene is added to an emulsion of sodium silicate prepared as in Example 1. The two were mixed with agitation and a dispersed sol was formed which set to spherical hydrogel particles within 25 minutes. The spheres formed from this sol were hard and firm and could be dried in air at moderate temperatures and then ignited at much higher temperatures. The dried particles are usually hard and are highly adsorbent. Previous to drying they may be impregnated with alumina or other suitable catalytic materials.

*Example III*

A silica sol is prepared by known methods, for instance 100 cc. of 25 Bé. sodium silicate is poured into 100 cc. of 23° Bé. sulfuric acid and mixed. This sol is added to 2 liters of kerosene or other light hydrocarbon oil containing a trace of emulsifier. The sol is dispersed with agitation and the agitation is continued while a similar emulsion of alumina sol (5.4% Al₂O₃) is prepared with kerosene or other light mineral oil and emulsifier. While still in a highly dispersed condition the alumina emulsion is poured into the silica emulsion and agitation is continued while setting takes place.

*Example IV*

Ten parts by volume of 25 Bé. sodium silicate (Na₂O 3.25 SiO₂) were suspended with agitation in 100 parts of normal butanol containing about 0.1 part of an emulsifying agent. There were added 50 parts of butanol containing 2% aluminum chloride. Almost immediately there were formed hard microspherical particles of silica-alumina gel. After washing out the electrolytes this material is suitable for the various catalytic uses to which such gels are usually put.

*Example V*

Ten parts of 25 Bé. sodium silicate were dispersed with agitation in 100 parts of normal butanol containing about 0.1 part of an emulsifying agent. There were added 50 parts of butanol containing 1.7 parts of 96% sulphuric acid. Almost immediately there was formed hard microspherical particles of silica gel.

The spherical gels prepared according to this invention are particularly suitable as catalysts in the fluid catalyst process for hydrogenating, dehydrogenating, alkylating, and isomerizing, hydrocarbons, reforming and desulfurizing naphtha, and for hydrogenating oxides of carbons. The spheres may also be used in abrasives, detergents, metal polishes and the like.

The nature and objects of the present invention having thus been fully set forth and specific examples of the same given, what is claimed as new and useful and desired to be secured by Letters Patent is:

1. Process for preparing inorganic hydrogel particles in a spherical form directly from the initial sol-forming components which comprises separately emulsifying the individual sol-forming components in a liquid capable of forming a separate layer in contact with water, combining and thoroughly mixing the separate emulsions to form an emulsified sol, maintaining the emulsified sol in suspension in said liquid by agitation for a sufficient length of time to cause the sol to set to a hydrogel.

2. Process for preparing silica-alumina hydrogel particles in spherical form which comprises separately emulsifying sodium silicate and aluminum chloride in benzene, combining and thoroughly mixing the separate emulsions to form an emulsified silica-alumina sol and maintaining the sol in suspension in said benzene by agitation for a sufficient length of time for it to set to a hydrogel.

3. Process for preparing silica hydrogel particles in spherical form which comprises emulsifying sodium silicate in benzene, adding said emulsified sodium silicate to a solution of acetic acid in benzene to form a silica sol, and maintaining said silica sol in suspension in said acidified benzene by agitation for a sufficient length of time to cause it to set to a hydrogel.

4. Process for preparing silica-alumina hydrogel particles in spherical form comprising separately emulsifying sodium silicate and aluminum chloride in normal butanol, combining and thoroughly mixing the separate emulsions to form an emulsified silica-alumina sol and maintaining said sol in contact with said butanol by agitation until said sol sets to a hydrogel.

5. Process for preparing silica hydrogel particles in spherical form comprising emulsifying sodium silicate in normal butanol, mixing with said emulsion a solution of sulfuric acid in butanol to form a silica sol, and maintaining said sol in contact with said butanol until said sol sets to a silica hydrogel.

6. Process for preparing silica-alumina hydrogel particles in spherical form comprising separately emulsifying a silica sol and an alumina sol in a mineral oil, mixing said separately emulsified sols to form a silica-alumina sol and maintaining said silica-alumina sol in contact with said mineral oil by agitation until said sol sets to a hydrogel.

7. A process for preparing inorganic hydrogel particles in spherical form directly from the initial sol-forming components which comprises agitating an emulsion of one of said sol-forming components in a liquid capable of forming a separate layer in contact with water, adding to said emulsion during said agitation another component capable of forming a sol with said emulsified component whereby said sol is produced in the form of minute droplets suspended in said liquid and containing said agitation for a sufficient length of time to cause said sol to set to a hydrogel.

JERRY A. PIERCE.
CHARLES N. KIMBERLIN, JR.

(References on following page)

REFERENCES CITED

The following references are of record in the file of this patent:

UNITED STATES PATENTS

| Number | Name | Date |
|---|---|---|
| 1,584,716 | Behrman | May 18, 1926 |
| 1,614,636 | Wachtel | Jan. 18, 1927 |
| 1,896,055 | Patrick et al. | Jan. 31, 1933 |
| 2,284,248 | Baker | May 26, 1942 |
| 2,385,217 | Marisic | Sept. 18, 1945 |

FOREIGN PATENTS

| Number | Country | Date |
|---|---|---|
| 15,365 | Great Britain | July 16, 1916 |
| 100,073 | Great Britain | Feb. 12, 1917 |

OTHER REFERENCES

Mellor: "Inorganic and Theoretical Chemistry," 1925, vol. VI, pages 291 and 299.